United States Patent
Kalogeropulos et al.

(10) Patent No.: US 9,430,201 B2
(45) Date of Patent: *Aug. 30, 2016

(54) COMPILING MULTI-THREADED APPLICATIONS FOR TARGETED CRITICALITIES

(71) Applicant: Oracle International Corporation, Redwood City, CA (US)

(72) Inventors: Spiros Kalogeropulos, Los Gatos, CA (US); Partha Tirumalai, Fremont, CA (US)

(73) Assignee: Oracle International Corporation, Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/464,867

(22) Filed: Aug. 21, 2014

(65) Prior Publication Data
US 2014/0365996 A1    Dec. 11, 2014

Related U.S. Application Data

(63) Continuation of application No. 13/485,176, filed on May 31, 2012, now Pat. No. 8,850,413.

(51) Int. Cl.
*G06F 9/44* (2006.01)
*G06F 9/45* (2006.01)
*G06F 9/445* (2006.01)

(52) U.S. Cl.
CPC *G06F 8/447* (2013.01); *G06F 8/30* (2013.01); *G06F 8/41* (2013.01); *G06F 8/71* (2013.01); *G06F 9/44536* (2013.01)

(58) Field of Classification Search
CPC .............................................. G06F 8/30–8/47
USPC ......................................... 717/106, 140, 151
See application file for complete search history.

(56) References Cited

U.S. PATENT DOCUMENTS

| | | | | |
|---|---|---|---|---|
| 5,835,776 A * | 11/1998 | Tirumalai | ............. | G06F 8/4452 717/150 |
| 5,920,721 A * | 7/1999 | Hunter | ...................... | G06F 8/47 717/146 |
| 6,115,550 A * | 9/2000 | Hunter | ...................... | G06F 8/47 717/162 |
| 6,608,638 B1 * | 8/2003 | Kodosky | ............. | G06F 11/2294 703/22 |
| 7,073,159 B2 * | 7/2006 | Tsai | .................... | G06F 17/5054 716/112 |

(Continued)

OTHER PUBLICATIONS

An Automatic Compiler Optimizations Selection Framework for Embedded Applications—Chia-Heng Tu, Huang-Sen Lin, Chi-Meng Chen, Shih-Hao Hung—Graduate Institute of Networking and Multimedia—Department of Computer Science and Information Engineering National Taiwan University Taipei, Taiwan—2009 International Conferences on Embedded Software.*

*Primary Examiner* — Francisco Aponte
(74) *Attorney, Agent, or Firm* — Marsh Fischmann & Breyfogle LLP; Kent A. Lembke

(57) ABSTRACT

Methods are disclosed of compiling a software application having multiple functions. At least one of the functions is identified as a targeted function having a significant contribution to performance of the software application. A code version of the targeted function is generated with one of multiple machine models corresponding to different target utilizations for a target architecture, specifically corresponding to the one with the greatest of the different target utilizations. The generated code version of the targeted function is matched with an application thread of the target architecture.

15 Claims, 2 Drawing Sheets

(56) References Cited

U.S. PATENT DOCUMENTS

| | | | |
|---|---|---|---|
| 7,140,010 B2* | 11/2006 | Tirumalai | G06F 8/47 717/151 |
| 7,308,393 B2* | 12/2007 | Lumpkin | G06F 17/5022 703/13 |
| 7,386,833 B2* | 6/2008 | Granny | G06F 17/5027 717/109 |
| 7,458,067 B1* | 11/2008 | Tirumalai | G06F 8/443 717/140 |
| 7,509,244 B1* | 3/2009 | Shakeri | G06F 9/5044 703/13 |
| 8,191,056 B2* | 5/2012 | Archambault | G06F 8/447 717/161 |
| 8,239,848 B2* | 8/2012 | Ghercioiu | G06F 8/61 717/100 |
| 8,448,140 B2* | 5/2013 | Isshiki | G06F 11/3419 717/124 |
| 8,645,934 B2* | 2/2014 | Fontenot | G06F 8/47 717/140 |
| 8,959,469 B2* | 2/2015 | Chen | G06F 17/5054 716/101 |
| 2004/0068716 A1* | 4/2004 | Stevens | G06F 8/47 717/140 |
| 2006/0206880 A1* | 9/2006 | Barraclough | G06F 8/443 717/140 |
| 2007/0192769 A1* | 8/2007 | Mimura | G06F 8/61 719/316 |
| 2007/0300213 A1* | 12/2007 | Adolphson | G06F 8/4434 717/151 |
| 2012/0079466 A1* | 3/2012 | Gonion | G06F 8/433 717/150 |
| 2012/0185834 A1* | 7/2012 | Ohrstrom | G06F 9/45504 717/148 |
| 2013/0081043 A1* | 3/2013 | Glew | G06F 9/5027 718/104 |
| 2013/0086565 A1* | 4/2013 | Gaster | G06F 8/41 717/148 |
| 2013/0086566 A1* | 4/2013 | Gaster | G06F 9/45525 717/148 |

* cited by examiner

COMPILING MULTI-THREADED APPLICATIONS FOR TARGETED CRITICALITIES

CROSS-REFERENCE TO RELATED APPLICATIONS

This application is a continuation of U.S. patent application Ser. No. 13/485,176, filed May 31, 2012, which is incorporated by reference herein in its entirety.

BACKGROUND OF THE INVENTION

This application relates generally to computer compilers. More specifically, this application relates to methods and systems for compiling multi-threaded applications for targeted criticalities.

For a number of decades, improvements in microprocessor performance have been realized at exponential rates. This has largely been a consequence of exploiting ever-increasing transistor budgets, which have allowed computer architects to increase processor frequency and instructions per cycle ("IPC"). But while Moore's law remains valid, diminishing returns are now being realized from conventional processor-design techniques, resulting in increased interest in alternative approaches for continuing to achieve performance gains.

Conventional compilers act to compile applications in a uniform way by assuming that all application threads have access to the same resources. Because of this, the full benefit of critical thread marking, which provides different resources to different application threads, is unrealized. For example, if a particular application spawns many threads that will run in parallel, or if other application threads share the core resources, then the binary code generated by the compiler is sub-optimal for the throughput environment. In such a throughput environment, instruction latencies can be covered by the execution of instructions from different threads or applications, so there is no need for the instruction scheduler to use full instruction latencies when scheduling instructions. Using full instruction latencies could increase the number of spills and reloads producing a binary that is less optimal.

This application accordingly discloses compiler methods that improve performance in a mixed serial and throughput execution environment.

SUMMARY

Embodiments of the invention provide methods of compiling a software application comprising a plurality of functions. At least one of the plurality of functions is identified as a targeted function having a significant contribution to performance of the software application. A code version of the targeted function is generated with a first of a plurality of machine models. The machine models correspond respectively to different target utilizations for a target architecture. The first of the plurality of machine models corresponds to a greatest of the different target utilizations. The generated code version of the targeted function is matched with a first application thread of the target architecture.

In some embodiments, a code version of at least one of the plurality of functions not identified as a targeted function is generated with a second of the plurality of machine models different from the first of the plurality of machine models. The second of the plurality of machine models corresponds to a least of the different target utilizations. The generated code version of the at least one of the plurality of functions not identified as a targeted function is matched with a second application thread of the target architecture different from the first application thread.

In some instances, at least another of the plurality of functions is identified as a second targeted function having a significant contribution to performance of the software application. A code version of the second targeted function is generated with a third of the plurality of machine models different from the first and second of the plurality of machine models. The third of the plurality of machine models corresponds to a target utilization intermediate between the greatest and the least of the different target utilizations.

Respective code versions of the targeted function may be generated with each of the plurality of machine models in some embodiments.

The at least one of the plurality of functions may be identified as the targeted function in different ones in different embodiments. In one embodiment, the plurality of functions is classified with execution profiling information. In another embodiment, the plurality of functions is classified in accordance with a received user indication. In a further embodiment, the plurality of functions is classified with static analysis.

One of the target models may correspond to an application thread using all resources of an architecture core. Another target model may correspond to an application thread using a fraction of resources of an architecture core, such as in embodiments where the fraction is substantially one-half. A further target model may correspond to an application thread using resources of an architecture core substantially equal to resources used if the core was equally shared by a number of architecture threads supported by the architecture core.

A variety of different modes may also be used in matching the generated code version of the targeted function with the first application thread. For example, application threads may be marked with a criticality index, with the matching being performed in accordance with the criticality index. Alternatively, the targeted function may be marked with a criticality index, with the matching being performed in accordance with the criticality index. In still other embodiments, an initial state of the first application thread may be defined as being in a noncritical state. The first application thread is allowed to enter a critical state so that the matching is performed in accordance with entry of the first application thread into the critical state. In some instances, these different modes may be resolved by giving phased execution the highest priority, marked functions an intermediate priority, and marked threads the lowest priority.

These methods of the invention may also be embodied in a nonvolatile computer-readable medium having computer-readable instructions thereon to compile a software application as described above.

BRIEF DESCRIPTION OF THE DRAWINGS

A further understanding of the nature and advantages of the present invention may be realized by reference to the remaining portions of the specification and the drawings, wherein like reference labels are used through the several drawings to refer to similar components. In some instances, reference labels are followed with a hyphenated sublabel; reference to only the primary portion of the label is intended to refer collectively to all reference labels that have the same primary label but different sublabels.

DETAILED DESCRIPTION OF EXEMPLARY EMBODIMENTS

Embodiments of the invention include techniques in which a compiler that distinguishes between different application threads or thread executions generates code to improve performance in a mixed serial and throughput execution environment. The enhanced compiler classifies the functions of the applications into different work categories and produces code optimized differently for each category using different machine models. These codes can accordingly be leveraged by the applications in different ways.

Figure 1:
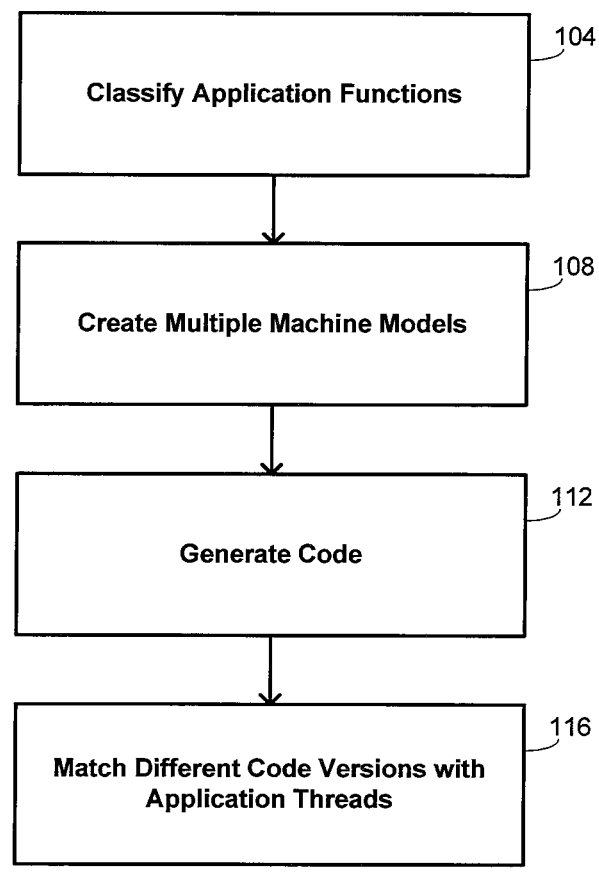
FIG. 1 is a flow diagram showing a high-level overview of methods of the invention.

A general overview of methods of the invention is provided with the flow diagram of FIG. 1. The description of the methods herein refers to an "application," which is used broadly to describe a set of software that performs a given task. It comprises a plurality of "functions," which are subset procedures that may be performed as part of performing the task as a whole. As indicated at block 104, the method begins by classifying functions of an application. Generally, such a classification is made according to the execution-time contribution of the functions to the performance of the application, such as may be measured by total execution time of the application. But in alternative embodiments, the classification can be made according to user-provided markings.

The classification is made into a plurality of categories. For example, in an embodiment in which the classification is made into two categories, the first may include those functions that have a significant contribution to total execution time of the application while the second includes those functions that make only a small contribution to the total execution time. Whether a contribution is "significant" may be defined in a number of different ways depending on the embodiment. Functions classified into the first category are sometimes referred to herein as "targeted" functions while functions classified into the second category are sometimes referred to herein as "nontargeted functions." It is noted that there is no requirement that the classification divide the functions in any predetermined proportion. Indeed, in some embodiments, the classification may result in all functions comprised by the application as targeted functions, meaning that each of them makes a significant contribution to the total execution time. Furthermore, discrimination between the categories need not be made in a uniform manner for all applications. For example, discrimination between the categories may be defined by comparison of a measure of each function with a threshold value, with functions having a measure greater than the threshold value being identified as targeted functions and functions having a measure less than the threshold value being identified as nontarget functions. In such instances, the classification for different applications may apply different threshold values. Merely by way of example, threshold values might be 50%, 40%, 30%, 25%, 20%, 15%, 10%, 5%, 2%, 1%, or some other value of the sum of all measures of all functions comprised by an application.

In some embodiments, execution profiling information is used to perform the classification. When such profiling information includes execution time, a simple measure of a function may accordingly be defined as the execution time as determined by the profiling information. In other instances, the measure of a function may account for other profiling information, such as number of calls of the function, memory consumption, and the like.

In other embodiments, processor directives such as pragmas or compiler command-line options identified by a user are used to discriminate between different functions. In a simple implementation of such embodiments, such user definitions may be applied absolutely, i.e. by categorizing exactly those functions identified by the user as significant to the targeted-function category and categorizing exactly all other functions to the nontargeted-function category. Alternatively, such user information may be used as one of multiple factors in performing the categorization.

In still other embodiments, static analysis may be used to classify the functions. A variety of techniques for static analysis will be known to those of skill in the art and may use such techniques as denotational semantics, axiomatic semantics, operational semantics, and others. As used herein, "static analysis" is intended to be construed broadly, including techniques that are sometimes identified as "metric analysis."

At block 108 of FIG. 1, multiple machine models are created for the target architecture, reflecting different target utilizations or sharing of available resources. Optimizing compilers that optimize code and target a particular architecture maintain an internal machine model that describes the characteristics of the targeted architecture. These characteristics may include such things as latencies of various instruction groups, number of instructions executed per cycle, instruction grouping rules, and other pipeline characteristics.

Various components of the compiler, such as the instruction scheduler, loop unroller, register allocator software pipelining, prefetch generation, and the like, use the target machine's description to drive their particular phases. For example, the compiler's instruction scheduler(s) use the machine-model description to schedule the instructions, i.e. to attempt to cover the instruction latencies with other independent instructions. With this strategy, instructions are scheduled optimally only when the binary uses all the modeled resources of the core.

For instance, in a specific example where there are eight threads that use the available resources, there is no need to fully cover the instruction latencies from one thread since work from other threads can cover the latency. Furthermore, if the instruction scheduler tries to schedule for higher instruction latencies than necessary, more or longer register live ranges will be introduced and result in higher register pressure, which could lead to more spilling and reloading of values. The extra spilling and reloading may be avoided if the instruction schedulers schedule for lower instruction latencies. If eight threads use the core resource and the utilization is spread uniformly across the threads, the instruction scheduler could schedule for ⅛ of the instruction latencies.

In embodiments of the invention, the compiler maintains a plurality of internal machine models describing the target architecture's characteristics such as latencies and resource lists for different levels of core utilization. For purposes of illustration, the following discussion presents three such machine models, but this is not intended to be limiting. The same principles of the invention may be applied using any plural number of machine models.

Figure 2:
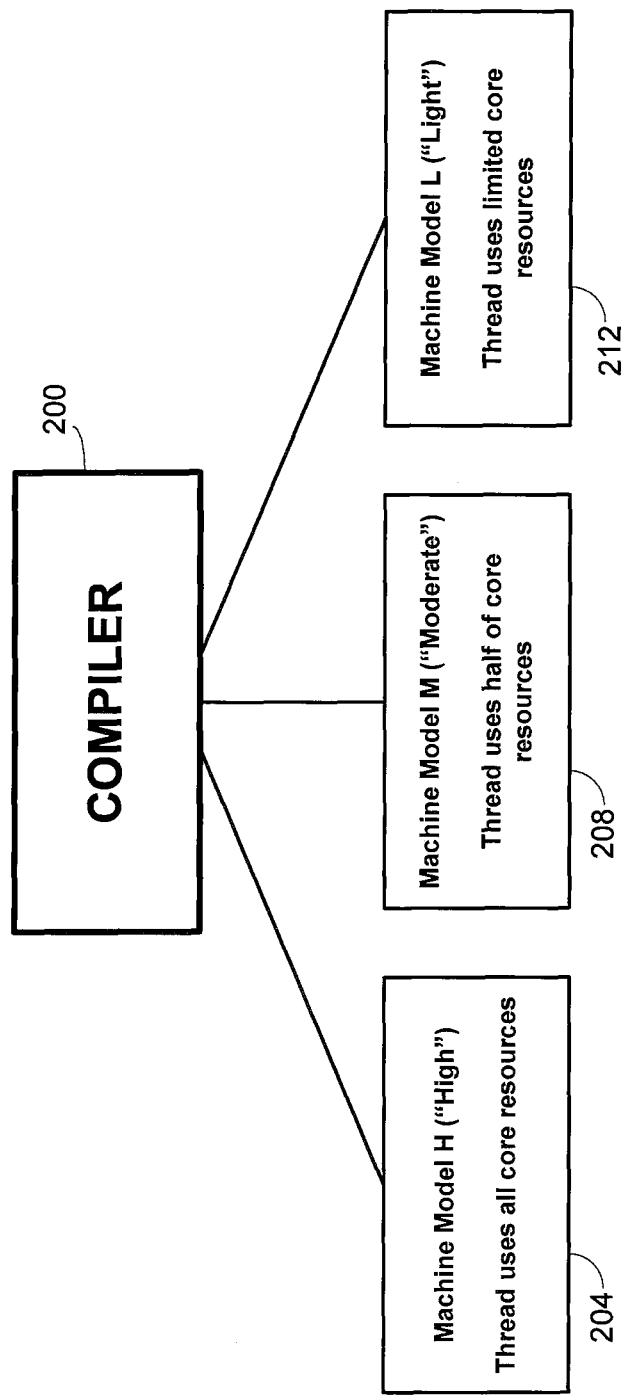
FIG. 2 provides a schematic illustration of a plurality of machine models maintained by a compiler.

FIG. 2 provides a schematic illustration of a compiler that maintains three machine models, identified as "high use," "moderate use," and "light use." The high-use model 204 corresponds to one in which a thread uses all the resources of a core. In this machine model, the instruction latencies reflect the actual instruction latencies of the core. It may thus be considered to be a "critical-thread" machine model.

The moderate-use model 208 corresponds to one in which a thread uses a defined fraction of the resources of a core, such as when the thread uses half the resources of a core. In this machine model, the actual instruction latencies are divided by a number that corresponds to the defined fraction of the number of threads potentially running on the core. In a variant, the defined fraction of the functional units is used.

The light-use model 212 corresponds to one in which a thread uses only the resources it would be entitled to if the core was equally shared by the number of hardware threads supported by the core. In this machine model, the actual instruction latencies may be divided by a number that equals the number of hardware threads supported by the core. In some instances, this usage may be modeled by adjusting the scalarity of the core or by adjusting a combination of scalarity and latency.

At block 112 of FIG. 1, code is generated for the application. For each function that has been classified as a targeted function at block 104, the machine models created at block 108 are used in turn and a code version is generated. For example, for a function foo ( ) that has been identified as a targeted function, the three models described in connection with FIG. 2 may be applied to generate three different versions of code for execution of that function: $code_H[foo( )]$, $code_M[foo( )]$, and $code_L[foo( )]$. For each function that has been classified as a nontargeted function at block 104, code is generated using a machine model suitable for light use, and may be generated using only the lightest core-utilization target model generated at block 108. In the same example, code may be generated using only the low-use model L for a nontargeted function goo( ): $code_L[goo( )]$.

At block 116, the different versions of code corresponding to different core-utilization targets are matched with the application threads. There are multiple ways in which this may be accomplished in different embodiments, with specific examples provided below.

In a "marked-thread" mode, application threads may be marked with a criticality index, with the value of the criticality index being used to define which of the multiple machine-model versions of the code generated at block 112 is used. The values of the criticality index that are used in this definition may vary in different embodiments, depending on such factors as the number of machine-models. For instance, in the exemplary embodiment described above in which there are three machine models, a thread with a high criticality index will use the H code version of the target functions, while a thread with a low criticality index will use the L code version of the target functions. A thread with moderate criticality index will use the M code version of the target functions. As is evident from the prior description, the assignment of code versions for the target functions can be done at execution time by the application user.

Merely by way of example, the division of criticality indexes that result in use of different code versions of target functions may be numerical. For instance, if the criticality index is defined to be between 0 and 1, with a critical index of 0 indicating that an application thread is not at all critical and a criticality index of 1 indicating that the application thread is maximally critical, cutoff values of (say) 0.25 and 0.75 might be used. Thus, in this example, if an application thread is assigned a criticality between 0.75 and 1, the H code version of the target functions will be used; if the assigned criticality is between 0.25 and 0.75, the M code version of the target functions will be used; and if the assigned criticality is between 0 and 0.25, the L code version of the target functions will be used.

In a "marked-function" mode, specific target functions may be marked for criticality with a criticality index similar to that described for the marked-thread mode. In embodiments that use a marked-function mode, typically only a single version of the code generated at block 112 is needed, and embodiments exist in which only that single version is generated at block 112. This may be the case, for example, in embodiments where the marking is known at the time of building the application. Having all model versions of the code in place, though, allows the marking to be performed at execution time. Referring to the example discussed above, in a marked-function mode, any thread that executes a critical function will select the H code version and the thread will become a critical thread for the duration of the function execution.

In a "phased-execution" mode, threads are allowed to enter and exit a critical phase of execution. By default, a thread starts in a noncritical state, and enters a critical state as a result of making a call or by an external agent putting it into the critical state. Once it has entered a critical state, all target functions are executed using their H version. Similarly, if a thread is in a semicritical state, it executes the M versions of the target functions.

The above modes may be resolved by assigning priorities to the modes, with one embodiment having a priority in which phased execution is given the highest priority, marked functions the next priority, and marked threads the lowest priority when deciding which version of a targeted function is to be executed.

The various methods of the invention described above may also be embodied in a nonvolatile computer-readable medium having computer-readable instructions thereon to compile a software application.

Having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of compiling a software application comprising a plurality of functions, comprising:
    identifying at least one of the plurality of functions as a targeted function having a significant contribution to performance of the software application by determining a time to execute at least one of the plurality of functions relative to a total execution time of the software application is greater than a threshold value, and classifying the plurality of functions with execution profiling information in addition to or in place of use of a time to execute, wherein the profiling information includes one or more measurements of the functions;
    generating a code version of the targeted function with a first of a plurality of machine models, the machine models corresponding respectively to different target utilizations for a target architecture and the first of the plurality of machine models corresponding to a greatest of the different target utilizations; and
    matching the generated code version of the targeted function with a first application thread of the target architecture,
    wherein the generating the code version of the targeted function with the first of the plurality of machine models comprises generating respective code versions of the targeted function with each of the plurality of machine models.

2. The method recited in claim 1, further comprising:
    generating a code version of at least one of the plurality of functions not identified as a targeted function with a second of the plurality of machine models different from the first of the plurality of machine models, wherein the second of the plurality of machine models corresponds to a least of the different target utilizations; and matching the generated code version of the at least one of the plurality of functions not identified as a targeted function with a second application thread of the target architecture different from the first application thread.

3. The method recited in claim 2 further comprising:

identifying at least another of the plurality of functions as a second targeted function having a significant contribution to the performance of the software application;

generating a code version of the second targeted function with a third of the plurality of machine models different from the first and second of the plurality of machine models, wherein the third of the plurality of machine models corresponds to a target utilization intermediate between the greatest and the least of the different target utilizations.

4. The method recited in claim 1, wherein the identifying the at least one of the plurality of functions as the targeted function comprises classifying the plurality of functions in accordance with a received user indication in addition to or in place of use of a time to execute.

5. The method recited in claim 1, wherein the identifying the at least one of the plurality of functions as the targeted function comprises classifying the plurality of functions with static analysis in addition to or in place of use of a time to execute.

6. The method recited in claim 1, wherein one of the machine models corresponds to an application thread using all resources of an architecture core.

7. The method recited in claim 1 wherein one of the machine models corresponds to an application thread using a defined fraction of resources of an architecture core.

8. The method recited in claim 7, wherein the defined fraction is one-half.

9. The method recited in claim 1, wherein one of the target models corresponds to an application thread using resources of an architecture core equal to resources used if the core was equally shared by a number of architecture threads supported by the architecture core.

10. The method recited in claim 1, wherein the matching the generated code version of the targeting function with the first application thread comprises:

marking the targeted function with a criticality index value; and matching the generated code version of the targeted function with the first application thread in accordance with the criticality index value.

11. The method recited in claim 1, wherein the matching the generated code version of the targeting function with the first application thread comprises:

defining an initial state of the first application thread as being in a noncritical state;

allowing the first application thread to enter a critical state; and matching the generated code version of the targeted function with the first application thread in accordance with entry of the first application thread into the critical state.

12. A method of compiling a software application comprising a plurality of functions, comprising:

identifying at least one of the plurality of functions as a targeted function having a significant contribution to performance of the software application by determining a time to execute at least one of the plurality of functions relative to a total execution time of the software application is greater than a threshold value;

generating a code version of the targeted function with a first of a plurality of machine models, the machine models corresponding respectively to different target utilizations for a target architecture and the first of the plurality of machine models corresponding to a greatest of the different target utilizations; and matching the generated code version of the targeted function with a first application thread of the target architecture, wherein the matching the generated code version of the targeted function with the first application thread comprises:

marking application threads with a criticality index value defining which of the plurality of machine models of the code generated is used; and matching the generated code version of the targeted function with the first application thread in accordance with the criticality index.

13. A method of compiling a software application comprising a plurality of functions, comprising:

identifying at least one of the plurality of functions as a targeted function having a significant contribution to performance of the software application;

generating a code version of the targeted function with a first of a plurality of machine models, the machine models corresponding respectively to different target utilizations for a target architecture and the first of the plurality of machine models corresponding to a greatest of the different target utilizations; and matching the generated code version of the targeted function with a first application thread of the target architecture, wherein the generating of the code version of the targeted function with the first of the plurality of machine models comprises generating respective code versions of the targeted function with each of the plurality of machine models, wherein the identifying of the at least one of the plurality of functions as the targeted function comprises classifying the plurality of functions with static analysis in addition to or in place of use of a time to execute, and wherein one of the machine models corresponds to an application thread using a defined fraction of resources of an architecture core, wherein instructions latencies from the application thread are divided by a number that corresponds to the defined fraction of the number of threads potentially running on the core.

14. The method recited in claim 13, wherein the identifying of the at least one of the plurality of functions as the targeted function comprises classifying the plurality of functions with execution profiling information in addition to or in place of use of a time to execute.

15. The method recited in claim 13, wherein the identifying of the at least one of the plurality of functions as the targeted function comprises classifying the plurality of functions in accordance with a received user indication in addition to or in place of use of a time to execute.

* * * * *